United States Patent
Brady et al.

(10) Patent No.: US 7,818,248 B2
(45) Date of Patent: *Oct. 19, 2010

(54) NETWORK AND METHOD FOR TRADING DERIVATIVES

(75) Inventors: Neal Brady, Evanston, IL (US); Noah Carey, Evanston, IL (US); William R. Erwin, Evanston, IL (US); John Gilmore, Burr Ridge, IL (US); Michael Quattrocki, Chicago, IL (US); Frank Stone, Chicago, IL (US); Mark Thornburgh, West Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/865,534

(22) Filed: Oct. 1, 2007

(65) Prior Publication Data
US 2008/0027851 A1 Jan. 31, 2008

Related U.S. Application Data (63) Continuation of application No. 10/001,237, filed on Oct. 30, 2001, now Pat. No. 7,337,140.

(60) Provisional application No. 60/244,311, filed on Oct. 30, 2000.

(51) Int. Cl.
G06Q 40/00 (2006.01)
(52) U.S. Cl. .......................................... 705/37; 705/30
(58) Field of Classification Search ............. 705/10–44, 705/37
See application file for complete search history.

(56) References Cited

U.S. PATENT DOCUMENTS 5,794,207 A 8/1998 Walker et al.

(Continued)

FOREIGN PATENT DOCUMENTS

JP 2002-056185 2/2002

(Continued)

OTHER PUBLICATIONS

Barron's, Nov. 4, 1991, "Derivatives Drive New Network", Barron's, 71, 44, ABI/INFORM Global, pp. 36-37.

(Continued)

Primary Examiner—Frantzy Poinvil
(74) Attorney, Agent, or Firm—Brinks Hofer Gilson & Lione (57) ABSTRACT

A computer network and method for electronically trading derivatives. The system includes networks and methods where a control or network managing station in the network acts as a facilitator for the market makers and subscribers to make a trade at an Exchange. In another embodiment the network managing station consummates the trade between a market maker and a subscriber by matching binding quotes and orders and clears the trade at an Exchange. The computer network for electronically trading derivative comprises: (a) network managing station; (b) one or more market maker stations; (c) one or more subscriber stations; (d) one or more Exchanges. The network managing station connects market makers and subscribers for making real time indicative quotes, issuing requests for quotes, obtaining binding quotes and wherein the market maker and subscriber are in communication with an Exchange for sending binding quotes and orders to the Exchange for clearing and confirming transactions.

25 Claims, 8 Drawing Sheets

U.S. PATENT DOCUMENTS

| | | | |
|---|---|---|---|
| 5,924,082 | A | 7/1999 | Silverman et al. |
| 5,950,176 | A | 9/1999 | Keiser et al. |
| 6,018,722 | A | 1/2000 | Ray et al. |
| 6,049,783 | A | 4/2000 | Segal et al. |
| 6,195,647 | B1 | 2/2001 | Martyn et al. |
| 6,236,972 | B1 | 5/2001 | Shkedy |
| 6,272,474 | B1 | 8/2001 | Garcia |
| 6,317,727 | B1 | 11/2001 | May |
| 6,321,212 | B1 | 11/2001 | Lange |
| 6,347,307 | B1 | 2/2002 | Sandhu et al. |
| 6,421,653 | B1 | 7/2002 | May |
| 6,505,174 | B1 | 1/2003 | Keiser et al. |
| 6,539,362 | B1 | 3/2003 | Patterson et al. |
| 6,618,707 | B1 | 9/2003 | Gary |
| 6,625,583 | B1 | 9/2003 | Silverman et al. |
| 7,340,430 | B2 | 3/2008 | Mulinder et al. |
| 2001/0032163 | A1 | 10/2001 | Fertik et al. |
| 2001/0034695 | A1 | 10/2001 | Wilkinson |
| 2001/0042036 | A1 | 11/2001 | Sanders |
| 2001/0044771 | A1 | 11/2001 | Usher et al. |
| 2002/0002530 | A1 | 1/2002 | May |
| 2002/0016760 | A1 | 2/2002 | Pathak |
| 2002/0069155 | A1 | 6/2002 | Nafeh et al. |
| 2002/0099651 | A1 | 7/2002 | May |
| 2002/0116317 | A1 | 8/2002 | May |
| 2002/0128955 | A1 | 9/2002 | Brady et al. |
| 2002/0138390 | A1 | 9/2002 | May |
| 2002/0156719 | A1 | 10/2002 | Finebaum et al. |
| 2002/0169703 | A1 | 11/2002 | Lutnick et al. |
| 2002/0174055 | A1 | 11/2002 | Dick et al. |
| 2003/0004853 | A1 | 1/2003 | Ram et al. |
| 2003/0023536 | A1 | 1/2003 | Hollerman et al. |
| 2003/0028476 | A1 | 2/2003 | Jenkins et al. |
| 2003/0033212 | A1 | 2/2003 | Sandhu et al. |
| 2003/0033240 | A1 | 2/2003 | Balson et al. |
| 2003/0061148 | A1 | 3/2003 | Alavian |
| 2003/0069836 | A1 | 4/2003 | Penney et al. |
| 2003/0083978 | A1 | 5/2003 | Brouwer |
| 2003/0093343 | A1 | 5/2003 | Huttenlocher et al. |
| 2003/0093360 | A1 | 5/2003 | May |
| 2003/0097328 | A1 | 5/2003 | Lundberg et al. |
| 2003/0101125 | A1 | 5/2003 | McGill et al. |
| 2003/0115128 | A1 | 6/2003 | Lange et al. |
| 2003/0216932 | A1 | 11/2003 | Foley |
| 2003/0220868 | A1 | 11/2003 | May |

FOREIGN PATENT DOCUMENTS

| | | |
|---|---|---|
| JP | 2002-149981 | 5/2002 |
| JP | 2002-329074 | 11/2002 |
| WO | WO 01/54040 A1 | 7/2001 |

OTHER PUBLICATIONS

Domowitz, Ian, 1995, "Electronic Derivatives Exchanges: Implicit Mergers, Network Externalities, and Standardization", The Quarterly Review of Economics and Finance, vol. 35, No. 2, Summer, 1995, pp. 163-175.
Senior, Adriana, Jun. 11, 1999, "Morgan Buying Into Network for On-Line Security Trades", American Banker, NewYork, NY, Jun. 11, 1999, vol. 164, Iss. 111; p. 1, obtained at the internet address: <http://www.proquest.umi.com/pqdlink?index=26&sid=1&srchmode=3&vinst=PROD&fmt=3&st....>, Mar. 25, 2004, 3 pages.
SwapsWire, Press Releases, Apr. 10, 2000, "Leading derivative dealers announce SwapsWire—a pioneering interest rate derivatives electronic dealing network", obtained at the internet address: <http://www.swapswire.com/press/10_04_00.asp>, Mar. 18, 2004, 2 pages.
Guardian Unlimited, The Guardian, Apr. 11, 2000, "Banks plan trading network for $52 trillion derivatives", obtained at the internet address: <http://vvww.guardian.co.uk/business/story/0,3604,178019,00.html>, Mar. 18, 2004, 2 pages.
Financial News Online, May 29, 2000, "Creditex Widens Access", obtained at the internet address: <http://www.efinancialnews.com/index.cfm?...>, Mar. 29, 2004, 1 page.
Ostrovsky, Arkady, Jun. 28, 2000, "Working towards a seamless link: GLOBAL PROTOCOL by Arkady Ostrovsky: A project aimed at automating the flow of information across the entire derivatives network will deal initially interest rate swaps, with other products being incorporated into the standard over time [Surveys edition]", Financial Times, London, Jun. 28, 2000, p. 4, obtained at the internet address: <http://proquest.umi.com/pqdlink?index=1&sid=1&srchmode=1&vinst=PROD&fmt=3&sta...>, Mar. 25, 2004, 3 pages.
Looksmart, Business Wire, Nov. 7, 2000, "onExchange Selects Exodus to Host Online Derivatives Exchange; Leading Online Derivatives Exchange Optimizes Network Performance by Selecting Leader in Complex Internet Hosting", obtained at the internet address: <http://www.findarticles.com/cf_0/m0EIN/2000_Nov_7/66657629/p1/article.jhtml>, Mar. 25, 2004, 3 pages.
Wall Street & Technology Online, Sep. 11, 2003, "Electronic Trading Newsflashes", obtained at the internet address: <http://www.wstonline.com/printableArticle/; jsessionid=ILJHDTNYRJNVMQSNDBCCKHY?doc_id=14...>, Dec. 5, 2003, 1 page.
Wall Street & Technology Online, Dec. 4, 2003, "Electronic-Trading Newsflashes", obtained at the internet address: <http://www.wstonline.com/printableArticle/; jsessionid=NA3QPNTTNKCOIQSNDBCCK...>, Dec. 5, 2003, 2 pages.
Sungard, "InTrader—The integrated, real-time solution for bank treasury and portfolio management", Sungard Securities Processing publication, 2003, 2 pages.
Network Magazine India, "Case Study: BSE implements intelligent switching architecture—Combining networks intelligently", obtained at the internet address: <http://www.expresscomputeronline.com/cgi-bin/ecprint/MasterPFP.cgi?doc=>, Dec. 5, 2003, 3 pages.
Network Magazine India, "BSE The Stock Exchange, Mumbai—Network Diagram", obtained at the internet address: <http://www.networkmagazineindia.com/200302/20030206bse.jpg>, Dec. 5, 2003, 1 page.
Orc Software, "ExNet Network", obtained at the internet address: <http://www.orcsoftware.com/Products/ExNetPIPNetwork.htm>, Dec. 5, 2003, 1 page.
Orc Software, "Orc Futures", obtained at the internet address: <http://www.orcsoftware.com/Products/OrcFutures.htm>, Dec. 5, 2003, 1 page.
Orc Software, "Orc Liquidator", obtained at the internet address: <http://www.orcsoftware.com/Products/OrcLiquidator.htm>, Dec. 5, 2003, 1 page.
Orc Software, "Orc Technology", obtained at the internet address: <http://www.orcsoftware.com/Technology/index.htm>, Dec. 5, 2003, 2 pages.
Orc Software, "Chicago Board of Trade certifies Orc Software for its electronic trading platform", obtained at the internet address: <http://www.orcsoftware.com/Company/PNR/PNR_031106_e-cbot_eng.htm>, Dec. 5, 2003, 2 pages.
Silicon Valley Biz Ink, "NYFIX, Inc. Routes OTC Orders to American Stock Exchange", obtained at the internet address: <http://www.prnewswire.com/cgi-bin/stories.pl?ACCT=SVBIZINK3.story&STORY=/www/story/11-24-2...>, Dec. 5, 2003, 2 pages.
Sungard, "Panorama EQN", obtained at the internet address: <http://www.sungard.com/products_and_services/stars/panorama/solutions/panoramaotcdistribution.htm>, Dec. 5, 2003, 2 pages.
Sungard, "Trading and Decision Support", obtained at the internet address: <http://www.sungard.com/products_and_services/stars/panorama/solutions/panoramatrading.htm>, Dec. 5, 2003, 5 pages.
Sungard, "Single Integrated Architecture", obtained at the internet address: <http://www.sungard.com/products_and_services/stars/panorama/solutions/panoramatechnologyandinfrastr...>, Dec. 5, 2003, 3 pages.
Trading Technologies International, Inc., "X_Trader TT Net", obtained at the internet address: <http://www.tradingtechnologies.com/blue_net.html>, Dec. 5, 2003, 1 page.

Trading Technologies International, Inc., "X_Trader Platform", obtained at the internet address: <http://www.tradingtechnologies.com/blue_trader.html>, Mar. 18, 2004, 3 pages.

Taulli, Tom. Investing in IPOs: Version 2.0. Bloomberg Press. Princeton. NH. 2001. pp. 40 - 41.

Dalton, John M. How The Stock Market Works. New York Institute of Finance. Paramus. NJ. 1993. pp. 121-126 and 148.

Curley, Michael T. & Walker, Joseph A. Barron's How to Prepare for the Stockbroker Examination Series 7. 2nd Edition, Barron's Educational Series. Hauppauge, NY. 2000. p. 181.

Kraynak, Joe. The Complete Idiot's Guide to PCs. 8th Edition. Alpha Books. Sep. 1, 2001. pp. 186-187.

Jennings, Nicholas R. & Woolridge, Michael J. Agent Technology. Springer. Heidelberg, NY. Apr. 1, 2000. pp. 25-26 and 267-268.

The Options Institute. Options: Essential Trading Concepts & Trading Strategies. McGraw-Hill. 1999. pp. 117-118.

O'Hara, Maureen. Market Microstructure Theory. Blackwell Publishing Ltd. Malden MA. 1997. pp. 7-9.

Angel, James J, Gastineau, Gary L!& Weber, Clifford J. Equity Flex Options: The Financial Engineer's Most Versatile Tool. Frank J. Fabozzi Associates. New Hope, PA. 1999. pp. 67-68.

Williams, Michael S. & Hoffman, Amy. Fundamentals of the Options Market. McGraw-Hill Companies. New York, NY. 2001. pp. 4-5, 56-58 and 87-89.

Turner, Martyn. The practical side of currency option dealing. Euromoney Treasury Manager. London, England. Nov. 5, 1993. p. 15.

Sales, Robert. Futures vet sees homogenized order-entry and execution in crystal ball. Wall Street & Technology. New York, NY. vol. 18, iss. 7. Jul. 2000. p. 126.

Turban, Efraim, McLean, Ephraim & Wetherbe, James. Information Technology for Management: Improving Quality and Productivity. John Wiley & Sons. 1996. pp. 237 and 310.

Chance, Don M. An Introduction to Derivatives: 4th Edition. The Dryden Press, Harcourt Brace & Company. Orlando, Florida. 1998, pp. 5,243 and 498.

Crawford, William B. Globex trading network ready for takeoff futures markets here could be recast. Chicago Tribune. Chicago, Illinois. Jun. 21, 1992. p. 1.

Cooper, Alan. About Fare: The Essentials of User Interface Design. IDG Books Worldwide. Foster City. CA. 1995. p. 203.

Murray, Rob. Money-Go-Round: 'Best price' share trading from Barclays. The Daily Telegraph. London, UK. Nov. 21, 1998. p. 9.

International Search Report PCT/US04/36206.

Securities Market in Contemporary Japan published on May 31, 2000 by Japan Securities Research Institute (pp. 158-161).

Derivative Keywords published by Kinzai Institute for Financial Affairs, Inc. (pp. 292-293), Jul. 28, 2000.

Electronic Commerce—A Managerial Perspective, First Edition (Japanese translation pp. 272-273, published by Pearson Education Co. Ltd.) originally published on Dec. 20, 2000, Prentice-Hall, written by Efraim Turban et al.

Notification of Reason for Rejection, Japanese Patent Office, Application No. 2004-545380, Feb. 2, 2010, 4 pages.

"Letting in Some Light: New Dealer Market Offers Juniors a Hand Up," The Northern Miner, Toronto, Ont., Aug. 11/17, 2003, vol. 89, Iss. 25; p. 4.

"CMC: Deal4Free to Launch a Client to Client Electronic Trading System; Client2Client Trading to Become Reality M2 Presswire," Conventry: Oct. 10, 2000, p. 1.

"The Striking Price: Needed: Big Changes," Cochran, Thomas N. Barron's, New York, N.Y.; May 9, 1994; vol. 74, Iss. 19; p. MW12, 1 pgs.

Notification of Reason for Rejection, Japanese Patent Office, Application No. 2006-542579, Mar. 9, 2010, 4 pages.

Communication of European Patent Office, Mar. 17, 2010, Application No. 04800517.7, 5 pages.

- 210 — PROVIDE INDICATION OF INTEREST AND OBTAIN RESPONSIVE INDICATIVE QUOTE
- 220 — SUBMIT A REQUEST FOR BINDING QUOTE
- 230 — RECEIVE INDICATION OF SUBMISSION OF A BINDING QUOTE
- 240 — SELECTIVELY SUBMIT ORDER

FIG. 2B

- 260 — RECEIVE INDICATION OF INTEREST AND PROVIDE RESPONSIVE INDICATIVE QUOTE
- 270 — RECEIVE A REQUEST FOR BINDING QUOTE
- 280 — SELECTIVELY SUBMIT BINDING QUOTE

| SYMBOL | CBT BID | LD BID | LD ASK | CBT ASK | LAST | CHANGE |
|---|---|---|---|---|---|---|
| OZF NI C 1045 | | 0.03  4.58%  800 | 0.04  4.90%  800 | | | |

○ BUY  ○ SELL  ⦿ BUY\SELL

| -100 | -50 | -25 | QTY: 100 | +25 | +50 | +100 |

SEND  CLOSE

FIG. 3D

L SUBSCRIBER-SELLING-OZF NI C 1045

○ BUY  ○ SELL    ORDER

| SYMBOL | CBT BID | LD BID | LD ASK | CBT ASK | LAST | CHANGE |
|---|---|---|---|---|---|---|
| OZF NI C 1045 | | 0.03  4.58%  800 | 0.04  4.86%  800 | | | |

| -100 | -50 | -25 | QTY: 100 | PRICE: 0.03 | -1 | -2 | -3 |
| +100 | +50 | +25 | ACCOUNT: TEST2-TEST2 | +1 | +2 | +3 |

RES: IOC  CUST ACT: TEST2  TEXT: TEST2  CLG MBR:  □ O/C: C  ACT: G  CTI: I  ORIG: I  EXT: M

SELL NOW    CANCEL

FIG. 3E

L SUBSCRIBER-SELLING-OZB NI C 1010 STRADDLE

○ BUY  ○ SELL    ORDER

| SYMBOL | CBT BID | LD BID | LD ASK | CBT ASK | LAST | CHANGE |
|---|---|---|---|---|---|---|
| OZB NI C 1010 STRADDLE | | 1.35  250 | 1.37  250 | | | |

| -100 | -50 | -25 | QTY: 100 | PRICE: 1.35 | -1 | -2 | -3 |
| +100 | +50 | +25 | ACCOUNT: 1234-1234 | +1 | +2 | +3 |

RES: IOC  CUST ACT: 1234  TEST: 1234  CLG MBR: CETCG  O/C: O  ACT: A  CTI: 2  ORIG: 2  EXT: E

SELL NOW    CANCEL

| SYMBOL | CBT BID | BID | LD BID | LD ASK | ASK | CBT ASK | LAST |
|---|---|---|---|---|---|---|---|
| OZBZICO960 | | 10.55 200 | 10.55 600 | 10.59 600 | 10.59 200 | | |

☑ BID   WIDEN  TIGHTEN   ☑ ASK

PRICE: 10.55   UP   PRICE: 10.59   QTY. INCREMENT
QTY: 600   DOWN   QTY: 600   ⦿ 50  ○ 100  ○ 250

ACCOUNT: 97201  RES: LIMIT  CUSTACCT: 97201  TEXT:
CLGMBR: CETCH  O/C: O  CTI: 4  ORIG: I  EXT: M  ACT: AI

SEND   CANCEL

FIG. 5C

QUOTES

| SYMBOL | CBT BID | LD BID | LD ASK | CBT | LAST | CHANGE |
|---|---|---|---|---|---|---|
| OZBHIPO980 | | 0.03  9.38% 1000 | 0.05  10.01% 1000 | | | |

BID   ASK

NARROW: QTY: 1000  PRICE: 0.03   QTY: 1000  PRICE: 0.05
☐ WIDE: QTY: 1000  PRICE: 0.03   QTY: 1000  PRICE: 0.05

RES: LIMIT  CUST ACCT: 97400  O/C: O  ACT: MI  CTI: 2  ORIG: 2  EXT: M

SEND   CANCEL

NETWORK AND METHOD FOR TRADING DERIVATIVES

REFERENCE TO RELATED APPLICATIONS

This application is a continuation under 37 C.F.R. §1.53(b) of U.S. patent application Ser. No. 10/001,237 filed Oct. 30, 2001 now U.S. Pat. No. 7,337,140, the entire disclosure of which is hereby incorporated by reference, which claims the benefit of the filing date under 35 U.S.C. §119(e) of U.S. Provisional Application Ser. No. 60/244,311 filed Oct. 30, 2000, which is hereby incorporated by reference.

FIELD OF THE INVENTION

The invention is in the field of electronically trading derivatives.

BACKGROUND

Electronic trading is revolutionizing the futures industry. For example, future contracts in Europe are 100% electronically traded. Trading of futures contracts in the United States will almost certainly be done electronically in the very near future. Five weeks after launch of the a/c/e electronic platform at the Chicago Board of Trade Exchange (CBOT) 25% of financial futures trades were made electronically. The rapid growth of electronic trading is further illustrated by the fact that the German-Swiss Exchange (EUREX) founded in 1990 has surpassed the CBOT as the leader in futures trading.

There are substantial limitations of current 'mainframe' electronic trading systems. Designed more than a decade ago, electronic futures trading platforms are based on rigid, outdated 'mainframe' architecture. All message traffic passes through centralized Exchange servers. Communication is 'one-to-all' and 'all-to-one', i.e. every price update triggers thousands of messages. Users are unable to flexibly query the market for indicative quotes for 'wholesale' orders or customized spread combinations. While 'mainframe' architecture works for futures trading with a single price point, it fails completely in markets that are 'relational', i.e. every price is linked to other—or hundreds of other—prices. This problem is illustrated by the relationship of E-futures, E-options and E-spreads.

Outright E-Futures have a single price point. As the futures price changes, traders cancel, modify and replace single orders. This is illustrated in Table I.

TABLE I

30-Year Bond Futures Book Contract - December 2000

| BIDS | | ASKS | |
|---|---|---|---|
| Quantity | Price | Price | Quantity |
| 350 | 98.21 | 98.22 | 220 |
| 250 | 98.20 | 98.23 | 150 |
| 300 | 98.19 | 98.25 | 400 |

Options involve puts and calls and combinations of puts and calls and/or futures, as well as straddles, strangles, butterflies, strips, etc. all of which result in thousands of price points being linked to each future. Thus, as the underlying futures price moves, thousands of price updates are needed. This is illustrated in Table II.

TABLE II

30-Year Bond Options Book Contract - December 2000

| | | BIDS | | ASKS | |
|---|---|---|---|---|---|
| Instrument | Strike | Quantity | Price | Price | Quantity |
| Call | 9800 | 200 | 130 | 136 | 100 |
| Call | 9900 | 150 | 55 | 63 | 50 |
| Put | 9800 | 50 | 47 | 52 | 250 |
| Put | 9700 | 175 | 28 | 31 | 300 |
| Straddle | 9600-1000 | 200 | 55 | 58 | 150 |
| Call Spread | 9800-1000 | 250 | 25 | 26 | 50 |

There are few 'real' prices displayed for options and spreads on electronic screens because market makers cannot make tight markets across numerous price points. As the futures price moves, 'stale' options and spread prices remain exposed to the market.

E-Options and E-Spreads require a blend of indicative and binding quotes. On a trading floor a trader has only one voice but quotes across hundreds of options and spreads. A trader makes continuous indicative quotes issuing hand held sheets with a grid of theoretical values. At the moment of trade, the indicative quote is 'refreshed' and becomes binding.

Current electronic options and spread markets have significant disadvantages. In the United States, despite the rapid growth of electronic futures, there is no real volume in electronic options and spreads. These markets still trade on the floor. In Europe, where futures markets are 100% electronic, price discovery in options and spreads takes place manually in an informal "cash" phone market. The European 'phone market' is widely disliked by all participants except the "cash" brokers who charge commissions to both sides of a trade. European options screens do not show 'real' prices. End users complain of the lack of transparency (only the "cash" brokers know the real bids and offers) and the inability of end users to verify that orders have received 'best execution' treatment. Users and market makers also do not like the high cost of "cash" brokerage. Brokerage costs for market makers are passed on to users in the form of wider bid—ask spreads. Exchanges, regulators and end users are concerned by the counterparty risk inherent to the system. Finally, market integrity rests on the performance guarantees of unregulated, thinly capitalized "cash" brokers.

U.S. Pat. No. 6,016,483 describes a computer-based system for determining a set of opening prices for options traded on an options exchange and for allocating public order imbalances at the opening of trade. This patent is incorporated by reference in its entirety.

SUMMARY

The invention is directed to a computer network and method for electronically trading derivatives. The invention includes networks and methods where a control or network managing station in the network acts as a facilitator for the market makers and subscribers to make a trade at an Exchange. In another embodiment the network managing station consummates the trade between a market maker and a subscriber by matching binding quotes and orders and clears the trade at an Exchange. The computer network for electronically trading derivative comprises: (a) network managing station; (b) one or more market maker stations; (c) one or more subscriber stations; (d) one or more Exchanges.

The network managing station connects market makers and subscribers for making real time indicative quotes, issuing requests for quotes, obtaining binding quotes and wherein the market maker and subscriber are in communication with an Exchange for sending binding quotes and orders to the Exchange for clearing and confirming transactions.

The method and network of the present invention provides for continuous quotes on the user's desktop that are backed up by significant liquidity. Numerous markets can be quoted simultaneously and users can make custom inquiries. The best price is guaranteed because the executed order matches the best price in the Exchange. The method and apparatus described herein enables liquid and efficient electronic trading of exchange listed products, thereby reducing risks associated with alternative over the counter mechanisms. That is, the system provides both the flexibility inherent in over-the-counter (OTC) trading and the reduced risk of Exchange matching and/or clearing. The system is unexpectedly advantageous in that it integrates, in real-time, market makers' indicative and binding quotes.

DETAILED DESCRIPTION OF THE DRAWINGS AND PRESENTLY PREFERRED EMBODIMENTS

Figure 1:
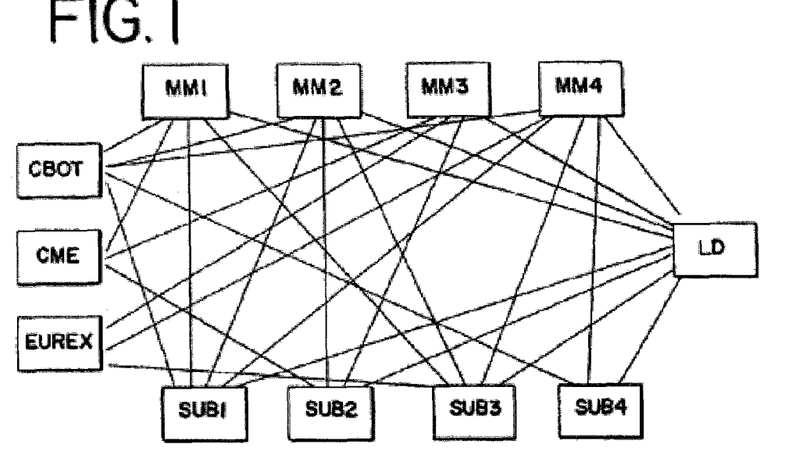
FIG. 1 is a schematic of the overall network (LD network)

FIG. 1 illustrates the network and interactions of market maker, subscriber, network manager and Exchanges. MM1, MM2, MM3, and MM4 are market maker servers that provide indicative and binding quotes. Sub 1, Sub 2, Sub 3 and Sub 4 are subscriber stations through which subscribers query indicative quotes, request binding quotes, and send orders to Exchanges such as the CBOT, CME and Eurex. LD is a network managing station that provides a directory of participants receiving or providing quotes. The network manager in one embodiment facilitates trading between subscribers and market makers who submit binding quotes and orders to an Exchange for clearance. In another embodiment, the network manager (LD) or control station may match the binding quotes and orders and send them to an Exchange for clearance. Through this network, market makers, subscribers, Exchanges and the network managing station can electronically communicate with each other. Subscribers can directly and flexibly query market makers' databases. The network minimizes traffic that passes through centralized servers and therefore has a high capacity. Messaging traffic of price updating is thereby reduced by limiting quote traffic to interested parties who query specific contracts and/or contract combinations.

A subscriber station (Sub 1, Sub 2, Sub 3 and Sub 4 of FIG. 1) has hardware and software to query indicative quotes, request binding quotes, and send orders to Exchanges. In one embodiment, the subscriber station consists of a Windows-based PC running an application that allows users to login, select symbols, and receive quotes for those symbols. Other embodiments include hand held computing devices that run the applications. Alternatively, the hand-held device acts as a wireless data terminal that communicates with the PC running the applications. As one of ordinary skill can appreciate, further alternatives hardware and software arrangements include hand-held devices and PC workstations, wherein the software functionality is appropriately divided between the two devices.

In another embodiment, the subscriber station is a gateway application connecting a subscriber's internal network to the network also referred to as the (LD) network. In this case, the functions of the subscriber station are controlled by other applications running throughout the subscriber's internal network. These applications may be trading front-ends or trading programs that the subscriber wishes to use to access the LD network. In this case, the LD subscriber gateway provides a protocol for passing messages between the networks. These messages include querying indicative quotes, quote updates, requesting binding quotes, and routing orders.

Figure 3A:
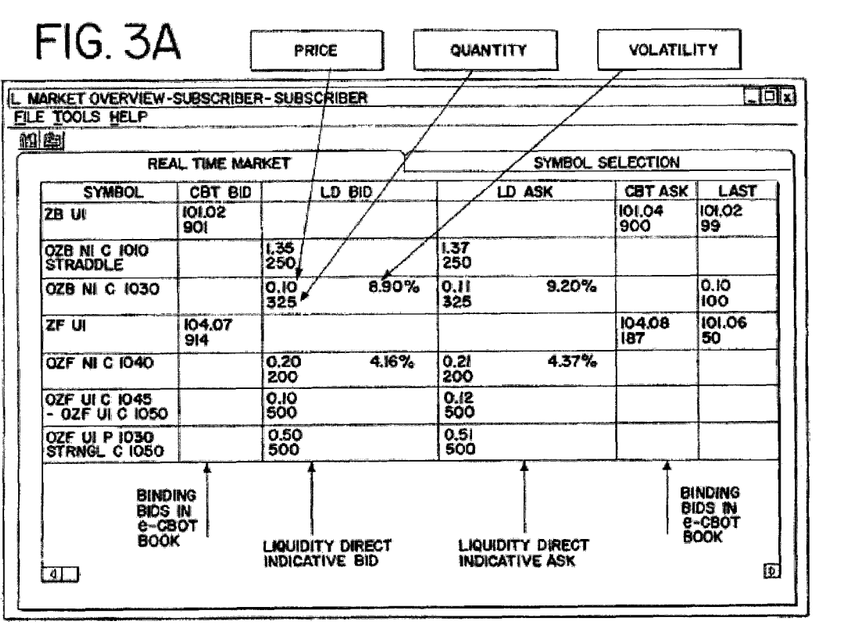
FIG. 3A is a schematic of a computer screen seen by a subscriber.

FIG. 3A illustrates an example of the Market Overview screen that displays indicative quotes for symbols and combinations of symbols as well as binding quotes in the Exchange order book. The CBT Bid/CBT Ask columns display the current best bid/ask price and quantity in the a/c/e electronic order book. The LD Bid/Ask columns display the best indicative bid/ask, size, and volatility from the market makers on the LD network. The screen of FIG. 3A displays real time price updates for symbols selected by the user via selection screen of FIG. 3B.

Figure 3B:
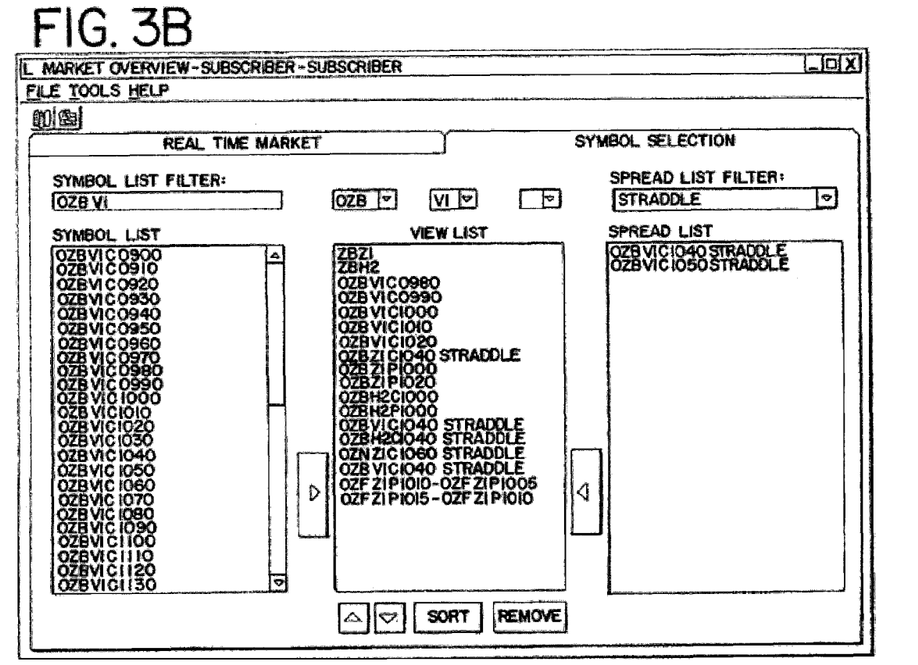
FIG. 3B illustrates the subscriber's query selection screen.

FIG. 3B is an example of the screen that allows the user to select symbols and combinations of symbols for which quotes will be requested. The selected symbols and the corresponding requests for indicative quotes provide an "indication of interest" or IOI to the market makers. Symbol Selection is performed as follows: highlight a symbol in the left column and use the button to move it to the view list, thereby making it an active symbol. Double-clicking a symbol also makes it active. Preferably, typing a value in the 'Symbol List Filter' box limits the content of the list—for example, typing 'OZB VI' displays the available thirty-year October options.

Selecting a spread is performed by highlighting a spread in the right column and then using the button to make it active. Double-clicking a spread also makes it active. The three drop-down boxes in the center filter the list of spreads by product, month, and Call or Put. The spreads can also be filtered by selecting the spread type from the drop-down over the right column.

Removing an item from the view list is done by double-clicking an item in the view list or highlighting the item and using the 'remove' button. Ordering the display is done with the 'sort' button, which causes the items in the view list to be sorted by symbol, expiration date, and strike. Individual symbols can be selected and moved up and down using 'up' and down.

Depending upon the hardware, software, and network conditions, the subscriber station may actively query market makers for updated quotes (every second, for instance, or when the underlying price moves). In other circumstances, the subscriber station receives quote updates in real-time (i.e. 'pushed' by the market makers).

Figure 3C:
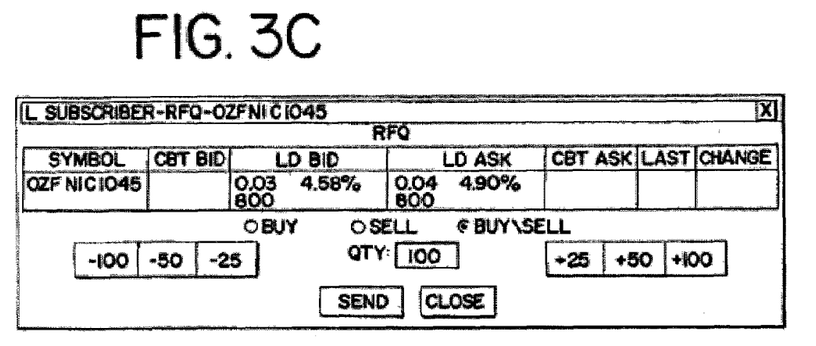
FIG. 3C, 3D and 3E illustrates a subscriber order ticket screen.
Figure 3D:
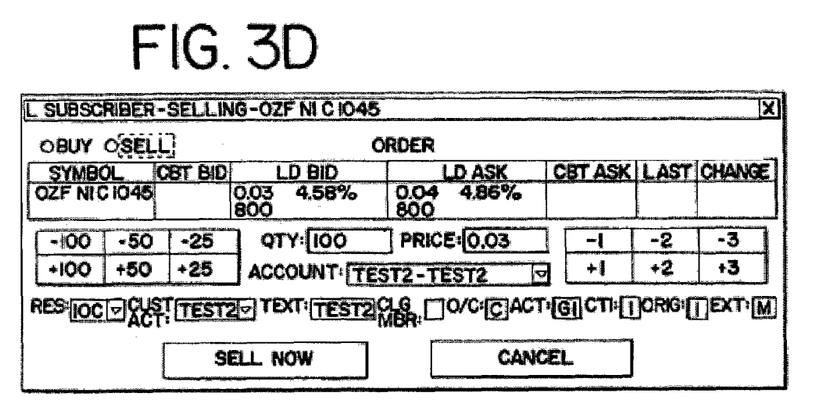
Figure 3E:
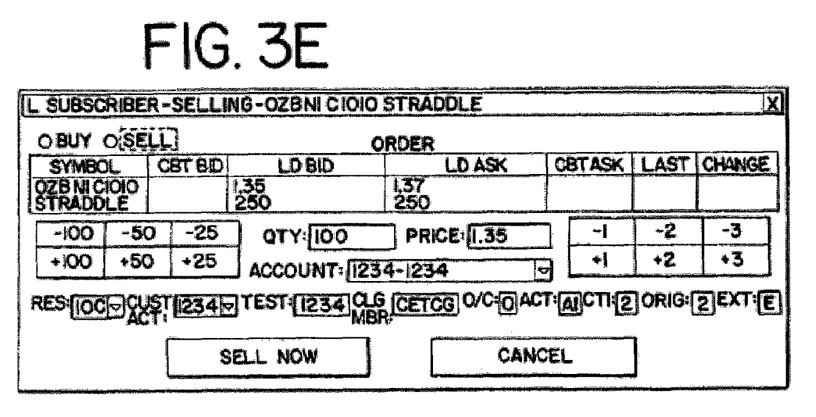

In one embodiment, when a user wishes to enter an order against one of the indicative quotes, double clicking the symbol pulls up an order entry window as shown in FIG. 3D (or FIG. 3E in the case of a straddle). Pressing the "sell now" button simultaneously informs the appropriate market maker of the request for a binding quote and submits the corresponding order to the exchange.

In yet another embodiment, the invention provides for unilateral communication in accordance with CFTC rules between subscribers and market makers for the submission of binding quotes and orders as a result of the unilateral communication. For example, a subscriber may receive an indicative quote from a market maker and respond by sending a request for quote (RFQ) to an Exchange, alerting all market participants of the RFQ. Thus, the market maker receives an RFQ from a subscriber at the same time the RFQ is received by other market participants. The market maker may immediately enter a binding quote at the Exchange and the subscriber may immediately enter an order at the Exchange.

In a further embodiment, the process of entering an order and trading with the LD network is a two-step process. The user first enters an RFQ that is sent to the LD market makers as well as to the Exchange (e.g., a/c/e, which is the CBOT electronic trading platform). After market makers enter their quotes into a/c/e, the user enters an order to match against the best bid (or ask) in the a/c/e book.

Thus when a user wishes to enter an order against one of the indicative quotes, the user preferably double-clicks the symbol (or by clicking on the bid or the ask price) in the display of FIG. 3A to activate a Request For Quote (RFQ) window as shown in FIG. 3C. The quantity may be left blank, or a value may be specified. Clicking send button sends the RFC simultaneously to the Exchanges, which effectively may result in sending the RFC to 30,000 terminals, and also sends the RFC to the LD network to the LD market makers. The RFC sent to the exchange preferably conforms to existing RFC exchange formats and would typically include only the contract of interest. In contrast, the RFC sent to the LD market makers preferably includes the contract of interest, the indicated price and the indicated quantity. Alternatively, the LD RFQ may also include additional parameters such as what side the requested quote is for (buy/sell). Upon sending the RFQ, the RFQ window of FIG. 3C is replaced with the Order Entry Screen of FIG. 3D (or FIG. 3E in the case of a straddle).

The order ticket shown in FIG. 3D allows the subscriber to change the quantity, price, and buy/sell. The subscriber can also select the appropriate account from a drop down list. After confirming the details, the order may be submitted. Preferably, the subscriber awaits an indication from the market maker that a binding quote has been submitted prior to submitting the order. This indication appears in the "CBT Bid" and/or "CBT Ask" fields of the Order Entry screen shown in FIG. 3D (or FIG. 3E). Such indication that a binding quote has been submitted is an advantageous feature of the system described herein.

Figure 5A:
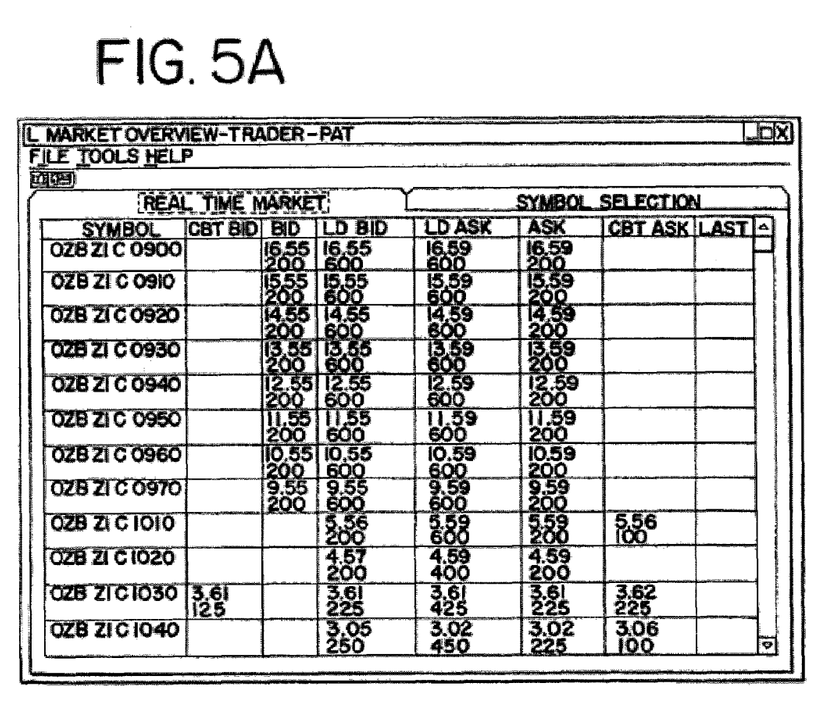
FIG. 5A illustrates an individual market maker's indicative quotes and the best LD indicative quote; and, FIGS. 5B and 5C illustrate embodiments of the market maker's binding quote ticket.
Figure 5B:
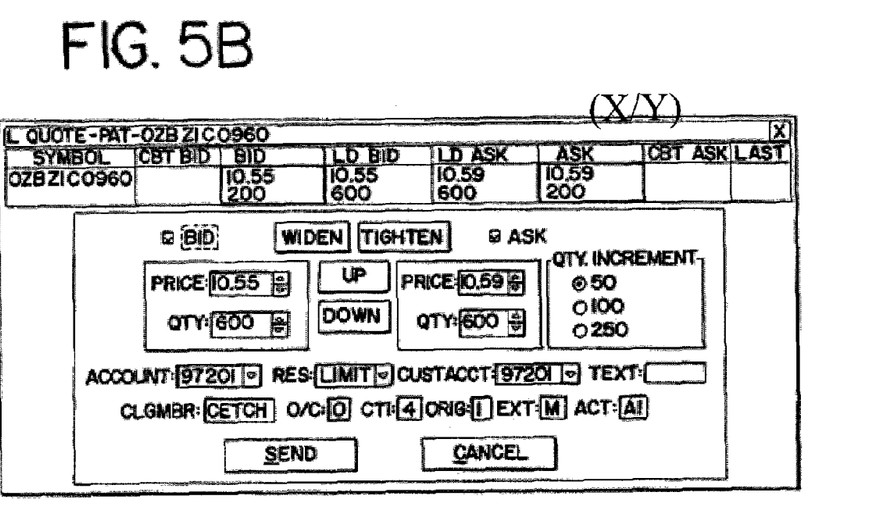
Figure 5C:
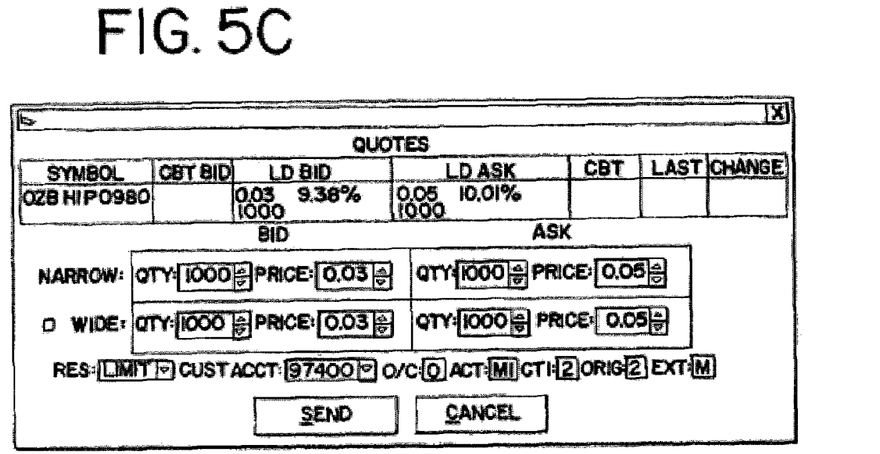

Specifically, the market maker station preferably displays the quote entry screen of FIG. 5B in response to the receipt of an LD RFQ sent by the subscriber. FIG. 5C depicts an alternative quote entry screen. The quote entry screen, upon display, has been "loaded" or preprocessed to incorporate data from the market maker's indicative quote, including the price and depth (volume of contracts). In a farther preferred embodiment, the loaded ticket may incorporate updated quote data based on more recent market data (such as changes to the price of the underlying instrument, or volatility). The quote entry screen thereby facilitates the market maker's entry of a binding quote in accordance with the market maker's indicative quote or an updated quote. Upon the market maker's submission of the quote and its receipt by the exchange, the subscriber's order entry ticket of FIG. 3D (or FIG. 3E) will be updated to reflect the binding quote data. The subscriber can then decide whether to submit the order after having evaluated the specific values (i.e., bid/ask and volume) associated with the binding quote. Preferably, all LD orders are IOC (Immediate or Cancel) or FOK (Fill or Kill). This means orders will either execute or cancel, and orders will not post to the book.

Figure 2A:
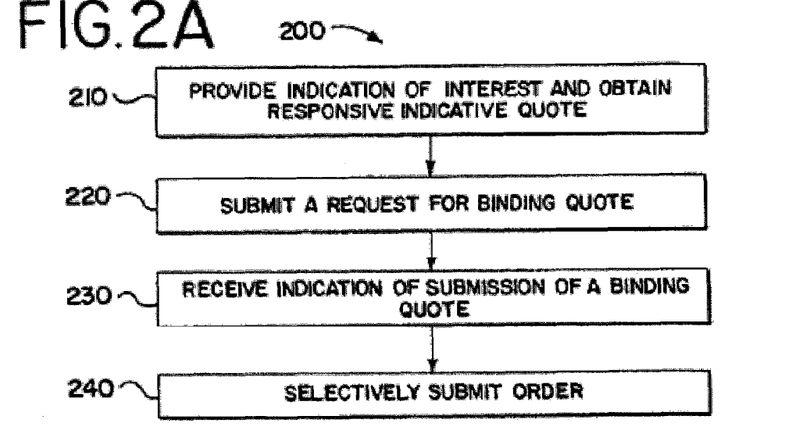
FIGS. 2A and 2B are flow diagrams of the interaction on the network of the market makers and a subscriber.
Figure 2B:
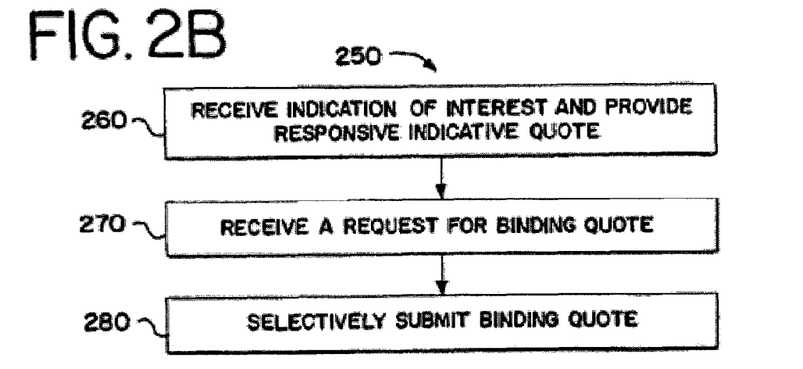

FIGS. 2A and 2B illustrate the interaction of the parties through the network by way of flow diagrams 200 and 250. Market makers, for example at station MM2 and MM4 of FIG. 1, connect to the network managing station (LD) to indicate quotable markets; At step 210, Subscriber station, e.g. Sub 3, provides and indication of interest by querying the network managing station for specific trading products and receives the address of market makers, for example, MM2 and MM4, and requests and receives indicative quotes. If the network managing station LD pushes a new futures price, this may be used to trigger Subscriber Sub 3 to query for updated quotes from market makers MM2 and MM3. As discussed above, other triggering devices may be used to cause subscribers to request updated quotes. For example, quotes may be requested at periodic intervals. The period may be a predefined period set by the subscriber, or may be adjusted up (or down) automatically in response to various other factors. Typical factors may include high (low) volume, high (low) volatility, or even an indication from the subscriber that an RFQ and/or order may be imminent. This indication may be by way of a screen activated button or similar subscriber input.

At step 210 in the process, a subscriber such as Sub 3 issues a request for quote (RFQ). The subscriber may then selectively submit an order in step 240, or preferably, may first await the completion of the optional step 230, which is the receipt of an indication that the market maker has submitted a binding quote.

With respect to FIG. 2B, the market maker's involvement is depicted in flow diagram 250. At step 260, the market maker receives an indication of interest from a subscriber and responds by providing one or more indicative quotes. Upon receipt of an RFQ, which is interpreted as a request for a binding quote in step 270, the market makers, for example MM3 and MM4, may respond by selectively sending a binding quote to an Exchange, or directly to the LD. In this way the network provides for electronic communication between market maker, subscriber and Exchanges with the assistance of a network managing station LD so that a subscriber can query market maker, initiation indications to trade, receive responses to indications to trade, issue binding quotes and forward binding quotes to an Exchange. The subscriber can send orders to an Exchange that can be electronically matched and cleared by an Exchange. In the alternative, the network managing station may match binding quotes and orders and clear the trades at an Exchange.

As discussed above, requests for binding quotes result in an updated bid/ask quote being sent to the Exchange. During this process, trading parameters under the control of the market maker are accessed to ensure that trading remains under the control of the market maker. In certain circumstances, the market maker may decline to submit a binding quote, or may change his quote from that displayed on the subscriber screen as indicative.

Specifically, a market maker station preferably has hardware and software to provide indicative quotes for subscribers and binding quotes to be sent to Exchanges. The options' theoretical values from which the quotes are derived are calculated using industry standard algorithms, namely the Black-Scholes Model and for certain instruments the American Whaley Model. Components of the quote are the bid price, bid quantity, ask price, and ask quantity. Additionally, the market maker calculates two sets of prices, one with a narrow spread (or range between the bid and ask), and one with a wider spread. This allows the market maker to switch between narrow and wide spreads during the trading day in response to market activity. Bid price and ask price are determined by decreasing (for bid) and increasing (for ask) the theoretical value by a variable amount that depends on various risk parameters, as follows:

N and W are parameters maintained by the market maker to determine the narrow and wide spread values; FV is the fair value of the option as calculated by the above-mentioned standard pricing models; V is Vega, a measure of the rate of change in an option's theoretical value for a one-unit change in the volatility of the underlying. Vega is an output of the standard pricing models.

Then, the bid and ask prices for the quote (B, A) are calculated as follows:

$$B(narrow) = FV - V*N$$

$$B(wide) = FV - V*W$$

$$A(narrow) = FV + V*N$$

$$A(wide) = FV + V*W$$

Quantity for the quote is calculated by taking four variables maintained by the market maker for each options month and using the Delta and Vega of the individual option symbol to calculate the quantity across the range of options strike prices, as follows:

$$Q = \max[Q_{min}, \min[Q_{max}, D_{max}/D, V_{max}/V]],$$

where $Q_{min}$ is the minimum quantity, maintained by the market maker; $Q_{max}$ is the maximum absolute quantity, maintained by the market maker; $D_{max}$ is the maximum quantity in terms of aggregate Delta, maintained by the market maker; $V_{max}$ is the maximum quantity in terms of aggregate Vega, maintained by the market maker; D is Delta, a measure of the rate of change in an option's theoretical value for a one-unit change in the price of the underlying security, and is an output of the standard pricing models; and, V is Vega, as defined above.

In one embodiment, the market maker station consists of a database containing pricing data from which quotes (both indicative and binding) are determined in response to a subscriber request. The parameters of this database are controlled by screens similar to FIGS. 4A, 4B and 4C.

The market maker generates a matrix of bid and ask prices and quantities at different volatilities and underlying prices that cover the expected short-term movement of the market. This matrix is accessed to provide indicative quotes, based on the current volatility (as controlled by the market maker) and the underlying price (usually provided by the appropriate Exchange in a data feed). Market makers "tweak" their bids and asks by changing their volatility levels. They can also pull (revoke) their quotes, either individually or by product, as well as send in new arrays at any time.

Figure 4A:
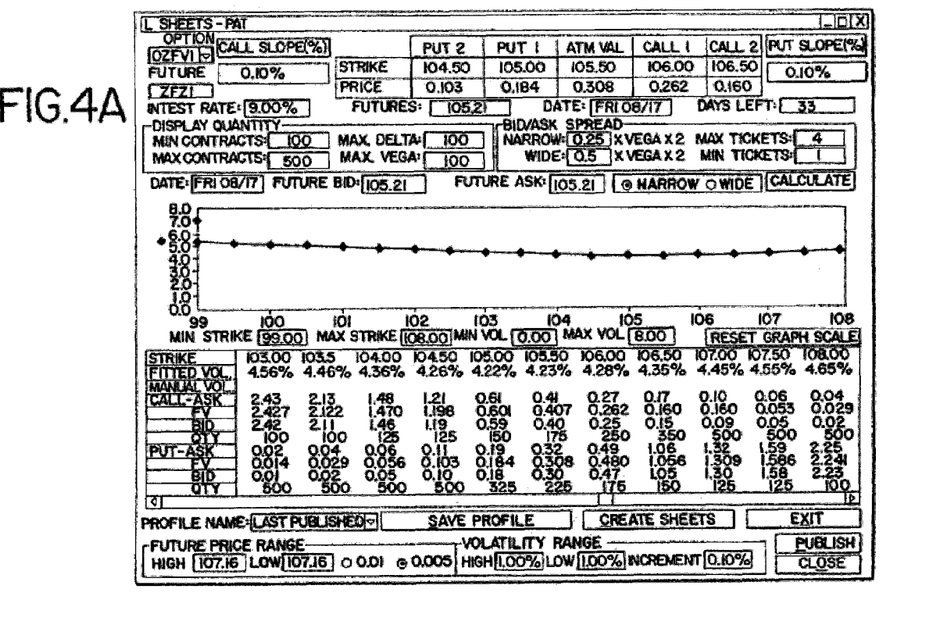
FIGS. 4A, 4B and 4C illustrate the market maker control screens.

The "Sheets" screen of FIG. 4A allows the market maker to calculate implied volatilities, Bid, Fair and Ask values and the Quantity, given a few inputs. The market maker may select an option from the drop-down box in the upper left corner (Future and Days Left boxes fill in automatically once option is chosen). To plot a new curve, the market maker enters strikes and prices for the option chosen. The table at the top of the Sheets window is used to enter strikes in decimal format Corresponding prices are entered using tick format. The put price is sued for the ATM strike. Other fields for the option chosen are entered. The slope is defined as (change in implied volatility)/(change in strike); 0.15 is a typical starting value for Call Slope and Put Slope which determine the curve's shape in the wings.

The market maker enters the Interest Rate, Futures (price in tick format) and Date, which can be any date as long as the entries made for strikes, prices and call/put slopes correspond to this date. The entries for the Display Quantity and Bid/Ask Spread fields (to be associated with the second Date) are completed, as well as the Min and Max Contracts. This will be used to limit the quantities shown on the Sheets screen and the Tweak screen of FIG. 4B. (Example: 100 Min and 500 Max will keep quantities between 100 and 500 regardless of quantity multiplier).

Figure 4B:
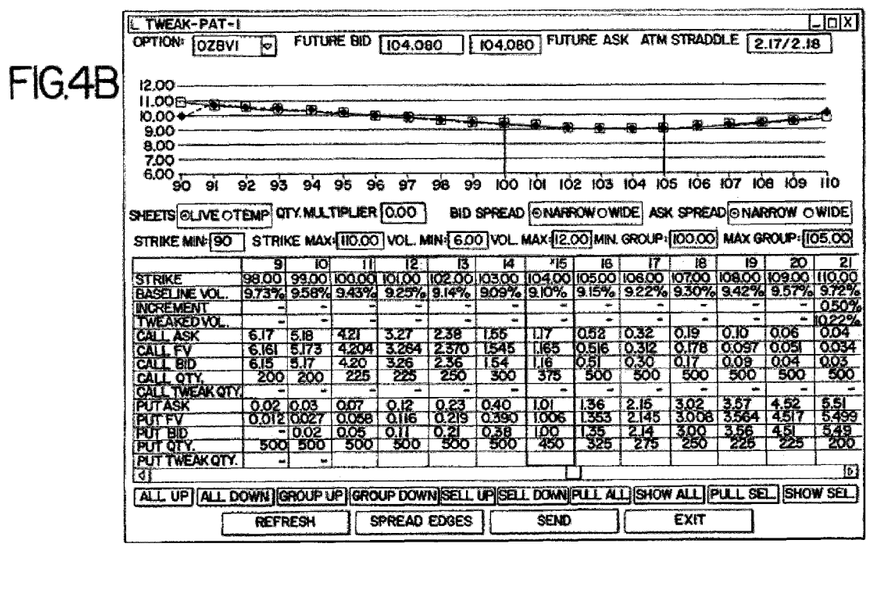

The market maker enters (in decimal format as a fraction of a tick) the width Of the preferred bid/ask spread. Vega preferably does not affect this calculation. (For example, entering 0.25 is a quarter tick above/below fair value for Bid/Ask). The market maker then enters (in ticks) the Max Ticks and Min Ticks allowed as the difference between the bid and the ask. The second Date, Future Bid and Future Ask (prices in tick format) are entered for which desired calculations are made in the large table below the graph. Then, the market maker selects Narrow or Wide to choose from the two sets of Bid/Ask Spread values that have been entered.

Finally, the market maker selects the "Calculate" button, resulting in new calculated values being entered in the large table. The Call Slope and Put Slope may be adjusted as necessary to obtain a suitable fit on wing prices in the table, followed by a recalculation to check table prices. Further, the parameters for the graph may be adjusted, including Min Strike, Max Strike, Min Vol and Max Vol. Selecting "Reset Graph Scale" applies the new choices to the graph. Entries made on the Sheets screen may be saved by selecting the "Save Profile" button (publishing is not required in order to save).

To publish, the market maker may select a future price range for which to publish by entering future prices (tick format) in the High and Low fields (preferably keeping this range at 4 points or less to keep publishing times down). The market maker then selects either full (0.01) or half tick (0.005) increments. For Volatility Range, the market maker enters a High, Low and volatility Increment at which to publish, and chooses an increment of at least 0.05 and Volatility Range of at most 1% for High and Low to avoid long publishing times. "High" represents the percentage that volatility will go up and "Low" represents the percentage that volatility will go down for this publishing period. The action is completed by clicking the "Publish" button. Data will be saved in a temporary table which can be made "Live" using the "Tweak" screen of FIG. 4B. If there is any existing temp data, a pop-up box will ask the user if this data should be overwritten. All data entry is saved as the profile "Last Published."

Figure 4C:
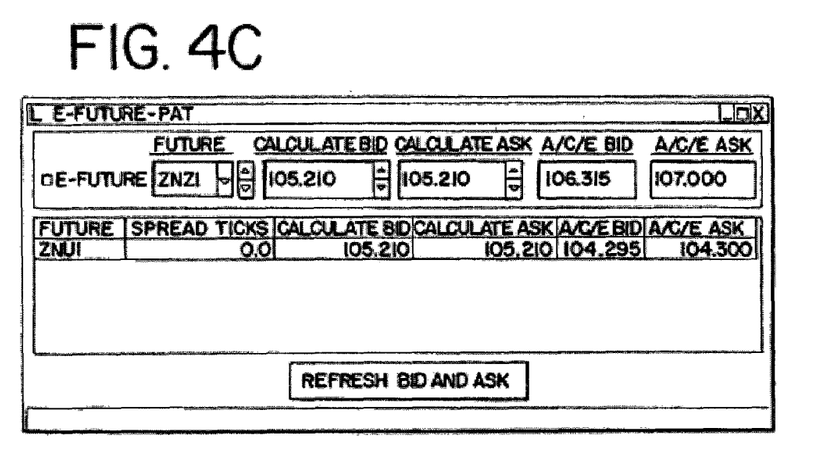

The Tweak screen is depicted in FIG. 4C, and is used to modify published "live" values (values that are being broadcasted to customers via Market Overview) without republishing. Once an option is published, Tweak contains temporary (Temp) data that may be modified by changing volatilities; once these changes are made, they can be applied to live data.

Depending on hardware, software, and network conditions, subscriber requests for indicative prices are treated either as a query which results in a single set of indicative quotes to be sent to the subscriber (every second, for instance, or when the underlying price moves), or as a request for continuous updates (i.e. 'pushed' by the market maker). For a request for continuous updates, the market maker station monitors the underlying price and other factors that determine the indicative quote and "pushes" a new indicative quote to the subscriber when necessary.

When a subscriber requests a price, the database process preferably uses the current futures price and market maker-specified volatility level to determine the current bid and ask for each market maker. The best price (highest bid and lowest offer) is then sent out to the subscriber. If two or more market makers are indicating the same price, the quantity is aggregated accordingly. The effect of this approach is to provide the subscriber with tighter and deeper markets due to the aggregation of competitive quotes from multiple market makers.

In another embodiment, the market maker stations generate indicative quotes for structured futures products, such as those traded in the Chicago Mercantile Exchange's Eurodollar complex or the London Financial Futures Exchange's Euribor complex. These products are characterized by the trading of several futures grouped as a single transaction. These are known generically as strips, and the CME further defines them as packs and bundles. A pack, for example, is the simultaneous transfer of one contract each of four consecutive futures months. Bundles involve the transfer of one contract each of four, eight, 12, or 16 consecutive futures months. As with options, indicative quotes are generated by the market maker stations and transmitted to subscribers. Subscribers then request binding quotes, and send orders into the exchange to match against the market maker's responses to those requests.

FIG. 4C shows the "Efuture" screen, which serves as an electronic eye to obtain Bid and Ask prices for any futures. It allows the user to set the spread value that determines the value of back-month futures used to determine options spreads. If necessary, this rule can be used to manually match the front-month future price. A/c/e Bid and Ask prices can be followed or alternative Bid and Ask prices may be used.

In one embodiment of the market maker station, the market overview screen, as shown in FIG. 5A, displays both the best bid and ask (as would be displayed to the subscriber) as well as the market makers' own bid and ask. Color coding is preferably used to indicate whether the market maker's own bid (ask) is at or below (above) the best bid (ask). FIG. 5B illustrates how this information is displayed on the Quote Entry window, used by the market maker to send binding quotes into the market.

In another embodiment, the market maker station is a gateway application connecting a market maker's internal network to the LD network. In this case, the functions of the market maker station are controlled by other applications running within the market maker's internal network. These applications may be trading front-ends or trading programs used to access the LD network. In this case, the LD market maker gateway provides a protocol for passing messages between the networks. These messages include receiving and responding to requests for indicative and binding quotes.

A network managing station has hardware and software to a directory of participants receiving and providing quotes. The network managing station consists of hardware (for instance, Windows-based servers) that runs application software that validates and coordinates the use of the LD network. Each subscriber and market maker station connects to the network managing station for the purpose of logging in. When market makers connect, they provide a list of products that they are interested in quoting. When subscribers connect, they provide a list of products they are interested in trading.

This list of products and participants is updated as users log in/out or change their product list. As this list changes, the network managing station notifies the participants. This allows each participant to respond accordingly. In one embodiment, the network managing station is not directly involved in the requesting of binding quotes, or sending quotes and orders to Exchanges, but rather monitors this activity and maintains an audit trail for review purposes. Depending upon the rules and regulations of a specific Exchange, however, the network managing station may serve as central matching utility, collecting orders and binding quotes from participants and transmitting matched trades to an Exchange for clearing.

An Exchange may be any listed Exchange or over-the-counter (OTC) entity that pluralities of LD participants agree is a suitable medium for transacting and clearing trades. An Exchange may have a central order book and regulations that require all orders to be matched on a "price-time" priority basis, or it may allow block trades to be transmitted and cleared outside of the central order book. In certain cases, an "Exchange" may consist of only a price reporting agency and a clearing house.

Those skilled in these arts will recognize a variety of system architecture, interphase devices, communication links, data management system and enabling software to carryout the invention. The network technology used for this invention may be Local Area (LAN), Wide Area (WAN), wireless, Internet or Intranet, or a combination of all these approaches. Message protocols may be based upon TCP/IP with additional functionality from Microsoft's Message Queue, but an XML-based protocol provides maximum flexibility and is preferred. Front-ends may include custom software programmed in Microsoft Visual Basic, Microsoft C++, and Java. Alternately a browser-based version can be implemented in HTML for platform-independent use. The market maker station users Microsoft SQL Server 7.0, but is portable to Oracle, Sybase, or SQL Server 2000. The above description is intended to illustrate the invention and not to limit it in spirit or scope.

We claim:

1. A system for trading derivatives, the system comprising:
a network;
at least one network managing station coupled with the network and operative to facilitate communications between at least one subscriber station and at least one market maker station such that any of the at least one subscriber station may request a continuous indicative quote from any of the at least one market maker station, the at least one network managing station being further operative to facilitate communication between any of the at least one subscriber station and any of the at least one market maker station such that the subscriber station may request a binding quote therefrom;
wherein the at least one market maker station is coupled with the network and operative to receive a request for a continuous indicative quote via the network for at least one product transmitted by one of at least one subscriber station, determine an indicative quote associated with the at least one product and provide the one of the at least one subscriber station with the indicative quote for only the at least one product via the network, the at least one market maker station being further operative to subsequently provide a subsequent indicative quote for only the at least one product via the network to the one of the at least one subscriber station superceding a previously provided indicative quote, the at least one market maker station being further operative to receive a request for a binding quote via the network for the at least one product transmitted by the one of the at least one subscriber station, determine a binding quote associated with the at least one product and respond to the one of the at least one subscriber station with the binding quote for only the at least one product via the network; and wherein the at least one subscriber station is coupled with the network and operative to transmit the request for an indicative quote for the at least one product to the at least one market maker station via the network, the at least one subscriber station being further operative to transmit the request for a binding quote for the at least one product to the one market maker station via the network.

2. The system of claim 1 wherein the subsequent indicative quote is different from the previously provided indicative quote.

3. The system of claim 1 wherein the at least one market maker station is further operative to provide the subsequent indicative quote upon the elapse of a period of time.

4. The system of claim 1 wherein the at least one market maker station is further operative to provide the subsequent indicative quote based on the occurrence of an event.

5. The system of claim 1 wherein the event comprises a change in the market for the at least one product.

6. The system of claim 1, wherein the identify of the market maker station and requesting subscriber are substantially anonymous.

7. The system of claim 6, wherein the at least one network managing station is further operative to transmit the request for an indicative quote to the market maker station on behalf of the requesting subscriber station.

8. The system of claim 6, wherein the at least one network managing station is further operative to transmit the request for a binding quote to the at least one market maker station on behalf of the requesting subscriber station.

9. The system of claim 6, wherein the at least one network managing station is further operative to transmit the indicative quote on behalf of the at least one market maker station to the requesting subscriber station.

10. The system of claim 6, wherein the at least one network managing station is further operative to transmit the binding quote on behalf of the at least one market maker station to the requesting subscriber station.

11. The system of claim 1, wherein:

the at least one subscriber station being further operative to receive at least one of the binding quote from the at least one market maker station and transmit an order based thereon via the network to an exchange for clearing and confirmation; and wherein the system further comprises:

at least one exchange operative to receive the order via the network for clearing and confirmation.

12. The system of claim 11, wherein the at least one network managing station further comprises:

an audit database operative to store a record of the request for an indicative quote and the request for a binding quote generated by the at least one subscriber station, the indicative quote and the binding quote generated by the at least one market maker station and the order transmitted by the at least one subscriber station; and wherein the at least one network managing station is further operative to monitor the network for requests for indicative quotes, requests for binding quotes, indicative quotes, binding quotes and orders and update the audit database based thereon.

13. The system of claim 1, wherein only a subset of the at least one market maker station receive the request for an indicative quote.

14. The system of claim 1, wherein a non-requesting subscriber stations of the at least one subscriber station does not receive the indicative quote.

15. The system of claim 1, wherein the network comprises a relational market wherein each of the at least one subscriber station is capable of communicating with each of the at least one market maker station to request and receive quotes.

16. A method for trading derivatives, the method comprising:

enabling communications by a computer between a requestor and a particular market maker station of a plurality of market maker stations to allow the requestor to request an indicative quote for at least one product of a plurality of products from the particular market maker station;

enabling communications by said computer between the requestor and at least the particular market maker station of the plurality of market maker stations to allow the requestor to request a binding quote for only the at least one product of the plurality of products from the at least particular market maker station; and whereby the requestor may cause transmission of the request for an indicative quote for the at least one product via a computerized network system to the particular market maker station of the plurality of market maker stations, the remaining of the plurality of market maker stations not receiving the request for an indicative quote, and whereby the particular market maker station may respond to the request for indicative quote with an indicative quote for only the at least one product and subsequently provide a subsequent indicative quote superceding the previous indicative quote, and further the at least particular market maker station may respond to the request for a binding quote with a binding quote for only the at least one product.

17. The method of claim 16 wherein the subsequent indicative quote is different then the previous indicative quote.

18. The method of claim 16 wherein the particular market maker station provides the subsequent indicative quote upon the elapse of a period of time.

19. The method of claim 16 wherein the particular market maker station provides the subsequent indicative quote based on the occurrence of an event.

20. The method of claim 19 wherein the event comprises a change in the market for the at least one product.

21. The method of claim 16, further comprising indicating a plurality of products for which the market maker associated with the particular market maker station is interested in quoting.

22. The method of claim 16, wherein the identity of the particular market maker station and requestor are substantially anonymous.

23. The method of claim 16, further comprises polling a plurality of market makers stations, each associated with a different market maker possibly interested in quoting for the at least one product and evaluating the responses thereto.

24. The method of claim 16, further comprising:

storing a record of the request for indicative quote and the request for binding quote generated by the requestor in an audit database; and monitoring the network for requests for indicative quotes, requests for binding quotes, indicative quotes and binding quotes, and updating the audit database based thereon.

25. A server for facilitating trading derivatives over a network, the server being coupled with a network and comprising:

means for enabling communications between a requestor and a particular market maker station of a plurality of market maker stations to allow the requestor to request an indicative quote for at least one product of a plurality of products from the particular market maker station;

means for enabling communications between the requestor and at least the particular market maker station of the plurality of market maker stations to allow the requestor to request a binding quote for only the at least one product of the plurality of products from the at least particular market maker station; and whereby the requestor may cause transmission of the request for an indicative quote for the at least one product via the network to the particular market maker station of the plurality of market maker stations, a remaining of the plurality of market maker stations not receiving the request for an indicative quote, and whereby the particular market maker station may respond to the request for indicative quote with an indicative quote for only the at least one product and subsequently provide a subsequent indicative quote superceding the previous indicative quote, and further the at least particular market maker station may respond to the request for a binding quote with a binding quote for only the at least one product.

* * * * *

UNITED STATES PATENT AND TRADEMARK OFFICE
CERTIFICATE OF CORRECTION

| | | |
|---|---|---|
| PATENT NO. | : 7,818,248 B2 | Page 1 of 1 |
| APPLICATION NO. | : 11/865534 | |
| DATED | : October 19, 2010 | |
| INVENTOR(S) | : Neal Brady et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 165 days.

Signed and Sealed this
Twenty-second Day of February, 2011

David J. Kappos
*Director of the United States Patent and Trademark Office*